United States Patent
Kobayashi et al.

(10) Patent No.: US 8,003,066 B2
(45) Date of Patent: Aug. 23, 2011

(54) METHOD FOR SCRUBBING AMINE-TYPE EXTRACTANT

(75) Inventors: Hiroshi Kobayashi, Niihama (JP); Hirofumi Shoji, Niihama (JP)

(73) Assignee: Sumitomo Metal Minning Co., Ltd., Tokyo (JP)

( * ) Notice: Subject to any disclaimer, the term of this patent is extended or adjusted under 35 U.S.C. 154(b) by 5 days.

(21) Appl. No.: 12/232,868

(22) Filed: Sep. 25, 2008

(65) Prior Publication Data
US 2009/0085005 A1 Apr. 2, 2009

(30) Foreign Application Priority Data
Oct. 2, 2007 (JP) ................. 2007-258322

(51) Int. Cl.
| | |
|---|---|
| *B01D 11/00* | (2006.01) |
| *B01D 15/04* | (2006.01) |
| *C01G 3/00* | (2006.01) |
| *C01G 5/00* | (2006.01) |
| *C01G 7/00* | (2006.01) |
| *C01G 1/00* | (2006.01) |
| *C01G 49/00* | (2006.01) |
| *C01G 51/00* | (2006.01) |
| *C01G 53/00* | (2006.01) |
| *C22B 11/00* | (2006.01) |
| *C22B 15/00* | (2006.01) |
| *C22B 1/00* | (2006.01) |
| *C22B 23/00* | (2006.01) |
| *B01F 1/00* | (2006.01) |

(52) U.S. Cl. ......... 423/139; 423/24; 423/27; 423/150.1; 564/497

(58) Field of Classification Search ............... 252/182.3; 423/24, 27, 139, 150.1; 564/497
See application file for complete search history.

(56) References Cited

U.S. PATENT DOCUMENTS
3,903,235 A * 9/1975 Cardwell et al. ................. 423/24
6,312,500 B1 * 11/2001 Duyvesteyn et al. ........... 75/712

FOREIGN PATENT DOCUMENTS
| | | |
|---|---|---|
| JP | 6-43620 | 2/1988 |
| JP | 3844752 | 4/2004 |
| WO | WO2008/080209 | * 10/2008 |

\* cited by examiner

*Primary Examiner* — Lorna M Douyon
*Assistant Examiner* — Tanisha Diggs
(74) *Attorney, Agent, or Firm* — Edwards Angell Palmer & Dodge LLP

(57) ABSTRACT

A method for scrubbing an amine extractant (A) containing an amine added with hydrochloric acid, and an amine binding a metal chloro complex ion, in a scrubbing stage constituting a solvent extraction step, characterized by substituting a chloride ion of the amine, which is added with hydrochloric acid, with sulfuric acid ion, by bringing the amine extractant (A) into contact with a sulfuric acid solution with a concentration of 3 to 10 N, and subsequently, by eliminating a metal by bringing the substituted amine extractant (B) into contact with water.

12 Claims, 1 Drawing Sheet

METHOD FOR SCRUBBING AMINE-TYPE EXTRACTANT

BACKGROUND OF THE INVENTION

1. Field of the Invention

The present invention relates to a method for scrubbing an amine-type extractant, and in more detail, the present invention relates to a method for scrubbing an amine-type extractant, which is capable of efficiently removing a chloro complex ion of a metal, in regeneration of the amine-type extractant supporting the chloro complex ion of a metal such as iron, zinc, which easily accumulates in the amine-type extractant, in a scrubbing stage constituting a solvent extraction step, as well as capable of regenerating extraction ability of the extractant so that it can be repeatedly reused as it is in an extraction stage of the solvent extraction step. It should be noted that the solvent extraction step here includes an extraction stage for supporting the chloro complex ion of a target metal contained in an aqueous solution of a raw material onto the extractant, by the amine-type extractant constituting an organic phase, and a subsequent reversed extraction stage for eliminating of a target metal, which is supported on the extractant of the organic phase, by an aqueous solution forming a water phase, and subsequently a scrubbing stage for separating and removing components remaining in the organic phase from the organic phase by an elimination or substitution reaction, by the aqueous solution forming the water phase.

2. Description of the Prior Art

In a hydrometallurgy of non-ferrous metal, various methods, where valuable metals are leached from ores or other raw materials and they are separated and purified from the resulting leaching solution, are carried out. For Example, in a hydrometallurgy of nickel, it is important technical element to separate nickel and cobalt contained in an aqueous solution of an acidic chloride, and in general, there are used an oxidative neutralization method utilizing the fact that cobalt is more easily oxidized than nickel, or an solvent extraction method with various organic extractants. Among these, the oxidative neutralization method has a problem that a reprocessing step of once separated cobalt precipitate is required separately in order to sufficiently separate cobalt, because high amount of nickel is co-precipitated in generating cobalt precipitate, and thus it could not be said a desirable method in the case where cobalt concentration in an aqueous solution of nickel is high.

On the other hand, in the solvent extraction method for separating nickel and cobalt, an organic extractant to be used is classified into a phosphate ester-type acidic extractant represented by CYANEX 272, and an amine-type extractant represented by TNOA (Tri-n-octylamine), TIOA (Tri-i-octylamine) or the like, and both types have excellent separation performance of cobalt and nickel. However, in general, in the case of an aqueous solution of a chloride with high concentration of a metal ion and a chloride ion in the solution, the amine-type extractant is used. These reasons include that the amine-type extractant has more excellent separation coefficient of cobalt and nickel as compared with the acidic extractant, in an aqueous solution under the above condition, due to formation of a cobalt chloro complex ion; and cost of the acidic extractant requiring a neutralization agent in extraction operation without generation of clad is difficult. It should be noted that "clad" is one forming a third phase, wherein the fine particular insoluble residue flown-in during the solvent extraction step, or generated in the solvent extraction step gather at an interface between an organic phase and a water phase, together with solvent deteriorated products and the like, which raises a serious problem in view of production efficiency.

By the way, in solvent extraction operation, the amine-type extractant has the following characteristics.

The amine-type extractant usually becomes to have sufficient extraction characteristics, by the addition of hydrochloric acid according to the following reaction formula 1, and shows excellent separation characteristics of cobalt and nickel, because extraction of a chloro complex ion is carried out according to the following reaction formula 2:

  [Formula 1]

By this reaction, an amine ($R_3N$:) generates an amine added with hydrochloric acid by hydrochloric acid.

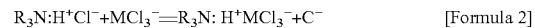  [Formula 2]

(wherein, M represents metal species, which form a chloro complex ion such as Zn, Fe, Cu, Co.)

According to this reaction, metal species, which form a chloro complex ion such as Zn, Fe, Cu, Co, are extracted to form an amine supporting a metal chloro complex ion. It should be noted that because nickel does not form a chloro complex ion, it is left in an extraction residual liquid and separated. Therefore, in the case where metals having higher formation capability of a chloro complex ion than cobalt, that is, more strongly supported metals, for example, chloro complex ion such as iron, zinc, is contained in a nickel aqueous solution, these metals are also extracted.

By the way, in a reversed extraction stage of cobalt from the amine-type extractant supporting the above metal chloro complex ion, cobalt is easily eliminated in the aqueous solution by bringing the extractant into contact with a weakly acidic aqueous solution. However, a chloro complex ion of a metal such as iron, zinc, which is more strongly supported than cobalt, is not eliminated so easily as cobalt. Therefore, in the case where the amine-type extractant is reused repeatedly in a solvent extraction step, iron, zinc or the like results in to be accumulated gradually in an extractant. Accordingly, supporting of cobalt onto the amine-type extractant in the extraction stage is interfered, and finally results in significant reduction of extraction of cobalt. As a method for solving this, there is installed a scrubbing stage for separating and removing these metals from the amine-type extractant supporting a chloro complex ion of a metal such as iron, zinc.

For Example, in the scrubbing stage, by bringing the amine-type extractant supporting a chloro complex ion of a metal such as iron, zinc, into contact with an aqueous solution not containing a chloride ion, and by reducing a chloride ion down to concentration to dissolve the chloro complex ion contained in the amine-type extractant, it is possible to separate and remove these metals, however, in order to attain this, a large quantity of scrubbing solution is required and thus not practical. Therefore, as other method, there has been proposed a method for removing a chloro complex ion accumulated in an extractant, by bringing it into contact with a strong alkali aqueous solution in a scrubbing stage, so as to be neutralized (for Example, refer to Patent Literature 1). It should be noted that in such a method by alkali neutralization, in general, by bringing an alkali solution of sodium hydroxide or the like into contact with the extractant, according to the following reaction formula 3, a metal chloro complex ion is removed as a hydroxide.

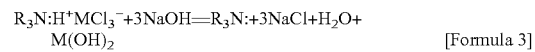  [Formula 3]

(wherein M represents metal species, which form a chloro complex ion such as Zn, Fe.)

In this case, iron is removed as hydroxide precipitate, or zinc is removed as hydroxide precipitate or a hydroxo complex ion, from the extractant, however, because it is a reaction accompanying precipitate formation, and filtering of the extractant composed of an organic solvent, along with the solution, is required, it was a troublesome work. In addition, because sodium hydroxide is expensive as an operation material, and thus not desirable to use in removing iron and zinc having small recovery merit, and still more the amine-type extractant itself returns to a free amine state by the above alkali neutralization, there was a problem that the addition of hydrochloric acid or sulfuric acid is required afterwards, in order to completely regenerate extraction capability thereof.

Still more, as other method, there has been proposed a method for hydrochlorination of an amine, in the scrubbing stage, by bringing the amine-type extractant supporting a chloro complex ion of a metal such as iron, zinc, into contact with an aqueous solution containing any of a sulfuric acid ion, a nitric acid ion, a phosphoric acid ion, and substantially not containing a chloride ion, to eliminate these metals, and then by bringing the eliminated amine-type extractant into contact with a solution containing a chloride ion (for Example, refer to Patent Literature 2), however, it requires a multiple times of scrubbing by using a fresh water phase to obtain sufficient reversed extraction ratio of zinc or the like, by only contact with a water phase composed of such an aqueous solution, which results in increased amount of a scrubbing solution.

Under these circumstances, it has been required a more efficient method for scrubbing, which is capable of attaining no accompanying of precipitate and clad formation, low cost of an operation material, and reduced amount of a scrubbing solution, in regeneration of extraction capability of an amine-type extractant supporting a chloro complex ion of a metal such as iron, zinc, in a scrubbing stage constituting a solvent extraction step.

Patent Literature 1: JP-B-06-043620 (page 1)
Patent Literature 2: JP No. 3844752 (pages 1 and 2)

SUMMARY OF THE INVENTION

It is an object of the present invention, in view of problems of the above conventional technology, to provide a method for scrubbing an amine-type extractant, in regeneration of the amine-type extractant supporting a chloro complex ion of a metal such as iron, zinc, which easily accumulates in the amine-type extractant, in a scrubbing stage constituting a solvent extraction step, which method is capable of efficiently removing a chloro complex ion of the metal, as well as capable of regenerating extraction capability of an extractant, so that it can be reused repeatedly as it is in the extraction stage of the solvent extraction step.

The present inventors have intensively studied a method for regenerating extraction capability of an amine-type extractant supporting a chloro complex ion of a metal such as iron, zinc, which easily accumulates in the amine-type extractant, to attain the above object, and found, as a result, that in a scrubbing stage, by bringing the amine-type extractant, which contains an amine added with hydrochloric acid, and an amine supporting a metal chloro complex ion obtained in a reversed extraction stage, into contact with a sulfuric acid solution with specific concentration, and subsequently by bringing the resulting amine-type extractant into contact with water, it is capable of efficiently removing a chloro complex ion of the metal such as iron, zinc, as well as capable of regenerating extraction capability of an extractant, so that it can be reused repeatedly as it is in the extraction stage, and have thus completed the present invention.

That is, according to a first aspect of the present invention, there is provided a method for scrubbing an amine-type extractant (A) containing an amine added with hydrochloric acid, and an amine supporting a metal chloro complex ion, in a scrubbing stage constituting a solvent extraction step, characterized by substituting a chloride ion of the amine, which is added with hydrochloric acid, with a sulfuric acid ion, by bringing the amine-type extractant (A) into contact with a sulfuric acid solution with a concentration of 3 to 10 N, and subsequently by eliminating a metal by bringing the substituted amine-type extractant (B) into contact with water.

In addition, according to a second aspect of the present invention, there is provided the method for scrubbing an amine-type extractant, in the first aspect, characterized in that the solvent extraction step has an extraction stage for supporting the metal chloro complex ion contained in an aqueous solution of an acidic chloride, onto the extractant, by the amine-type extractant constituting an organic phase, and a subsequent reversed extraction stage for eliminating cobalt, which is supported on the extractant of the organic phase, by an aqueous solution forming a water phase, and subsequently a scrubbing stage for separating and removing components remaining in the organic phase by an elimination or substitution reaction, by the aqueous solution forming the water phase.

In addition, according to a third aspect of the present invention, there is provided the method for scrubbing an amine-type extractant, in the first aspect, characterized in that the amine-type extractant (A) is a reversed extracted amine-type extractant produced in the reversed extraction stage for eliminating cobalt by an aqueous solution of diluted hydrochloric acid, from the extractant supporting cobalt, which is produced in the extraction stage constituting the solvent extraction step, in the solvent extraction step for separating nickel and cobalt in a leaching solution having the aqueous solution of an acidic chloride, containing nickel and cobalt, along with trace amount of other metals.

In addition, according to a fourth aspect of the present invention, there is provided the method for scrubbing an amine-type extractant, in the first aspect, characterized in that the amine is at least one kind of a tertiary amine selected from TNOA or TIOA.

In addition, according to a fifth aspect of the present invention, there is provided the method for scrubbing an amine-type extractant, in the fourth aspect, characterized in that the tertiary amine is mixed with a diluent composed of an aromatic hydrocarbon, and is contained in an amount of from 10 to 40% by volume relative to total amount of the amine-type extractant (A).

In addition, according to a sixth aspect of the present invention, there is provided the method for scrubbing an amine-type extractant, in the first aspect, characterized in that the concentration of sulfuric acid is from 4 to 5 N.

In addition, according to a seventh aspect of the present invention, there is provided the method for scrubbing an amine-type extractant, in the first aspect, characterized in that contacting stage number of the amine-type extractant (A) and the sulfuric acid solution, is from 2 to 4 stages, in contact with the sulfuric acid solution.

In addition, according to an eighth aspect of the present invention, there is provided the method, in any one of the first to seventh aspects, characterized in that the metal is iron and/or zinc.

ADVANTAGES OF THE INVENTION

Because a method for scrubbing an amine-type extractant of the present invention is a method for scrubbing an amine-type extractant, which is capable of efficiently removing a chloro complex ion of a metal such as iron, zinc, which easily accumulates in the amine-type extractant, as well as regenerating extraction capability of an extractant, so that it can be reused repeatedly as it is in the extraction stage of the solvent extraction step, in scrubbing the amine-type extractant containing an amine added with hydrochloric acid, and an amine supporting a metal chloro complex ion, in a scrubbing stage constituting the solvent extraction step, industrial value thereof is extremely high. Still more, because in this case, precipitate and clad formation are not accompanied, cost of an operation material is low, and amount of a scrubbing solution is reduced, it is more advantageous as compared with conventional methods.

DETAILED DESCRIPTION OF THE INVENTION

Figure 1:
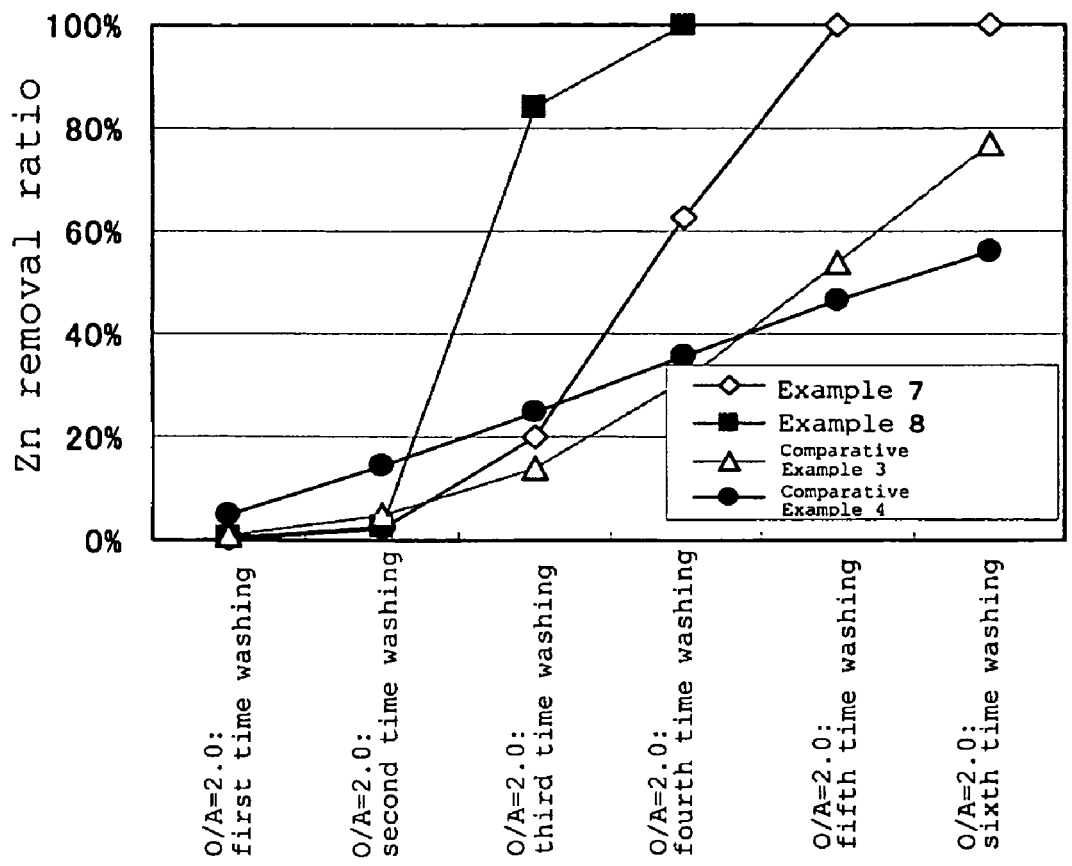
FIG. 1 is a drawing showing accumulated zinc removal ratio in each of scrubbing times (Examples 7 and 8, and Comparative Examples 3 and 4).

A method for scrubbing an amine-type extractant of the present invention is a method for scrubbing an amine-type extractant (A) containing an amine added with hydrochloric acid, and an amine supporting a metal chloro complex ion, in a scrubbing stage constituting a solvent extraction step, characterized by substituting a chloride ion of the amine, which is added with hydrochloric acid, with a sulfuric acid ion, by bringing the amine-type extractant (A) into contact with a sulfuric acid solution with a concentration of 3 to 10 N, and by eliminating a metal by subsequently bringing the substituted amine-type extractant (B) into contact with water.

In the present invention, chloride ion concentration of a scrubbing solution, which is made equilibrium by bringing it into contact with the above amine-type extractant (A), has important technological significance. That is, in general, by using a scrubbing solution not containing a chloride ion, and by bringing this into contact with an extraction solution accumulated with a metal such as iron, zinc, which easily accumulates in the amine-type extractant, in multistage, the chloride ion is reduced down to a level to dissolve a chloro complex ion so as to enable to remove the metal, however, in removing a metal having high formation capability of a chloro complex ion, such as iron or zinc, by only repeating a simple scrubbing, a large quantity of scrubbing solution is required for dilution so that chloride ion concentration of a water phase in an equilibrium state becomes sufficiently low.

On the other hand, in the present invention, by carrying out two stages, that is a step (1) by using a sulfuric acid solution with a concentration of 3 to 10 N and a step (2) by using water, as scrubbing solutions, in this order, it is possible to efficiently remove a metal chloro complex ion from the above amine-type extractant (A), as well as regenerate extraction capability of an extractant, so that it can be reused repeatedly as it is in the extraction stage.

That is, the step (1) is a scrubbing stage for substituting a chloride ion of the amine, which is added with hydrochloric acid, with a sulfuric acid ion, by bringing the above amine-type extractant (A) into contact with a sulfuric acid solution with a concentration of 3 to 10 N. This scrubbing stage is carried out by substitution of a chloride ion, added with hydrochloric acid, contained in the amine-type extractant (A), with a sulfuric acid ion preferentially, according to the following reaction formula 4:

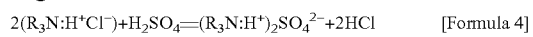

$$2(R_3N:H^+Cl^-)+H_2SO_4 = (R_3N:H^+)_2SO_4^{2-}+2HCl \quad \text{[Formula 4]}$$

Here, the substitution reaction utilizes selectivity to an anion in an aqueous solution in an equilibrium state with the amine-type extractant. That is, when sulfuric acid ion concentration in an aqueous solution in an equilibrium state with the amine-type extractant becomes predetermined value or higher, a chloride ion added to the amine-type extractant is efficiently substituted to a sulfuric acid ion, according to the above reaction formula 4. Still more, because, under such high sulfuric acid concentration, anion selectivity of the amine-type extractant becomes higher toward a chloro complex ion of iron or zinc than toward a sulfuric acid ion, an amine supporting a chloro complex ion of iron or zinc is stable, and elimination amount of iron or zinc is little. Therefore, a large part of chloride ions of an amine added with hydrochloric acid other than the metal chloro complex ion, is substituted with a sulfuric acid ion, and thus the amine-type extractant (B) with sufficiently reduced concentration of a chloride ion is obtained.

Concentration of sulfuric acid of a sulfuric acid solution to be used in the above step (1) is from 3 to 10 N, preferably from 4 to 5 N. That is, in the concentration of sulfuric acid below 3 N, substitution from a chloride ion added to the amine-type extractant to a sulfuric acid ion is difficult to progress. On the other hand, the concentration of sulfuric acid over 10 N does not provide substitution effect in proportion to the concentration of sulfuric acid, and cost does not balance. Still more, the case of excessively high concentration of sulfuric acid incurs oxidation of an extractant by oxidizing property of sulfuric acid itself.

Contacting stage number of the amine-type extractant (A) and a sulfuric acid solution to be used in the above step (1), that is, stage number of scrubbing stages is not especially limited, and it is preferable to carry out under 2 to 6 multistages than 1 stage, and more preferably from 2 to 4 stages. That is, it is because of strong influence of chloride ion concentration in sulfuric acid to be used as a scrubbing solution on anion selectivity of the extractant, and even in the case of using the same amount of sulfuric acid, the multistage is more capable of enhancing substitution efficiency between a sulfuric acid ion and a chloride ion.

As operation of each stage of the above scrubbing stages, a batch system, or a continuous system such as a counter-current, parallel-current is used, and in each stage, there is used a solvent extraction apparatus such as a mixer-settler system generally industrialized, where an organic phase and a water phase are subjected to mixing and contacting, for example, by stirring, so as to be contacted sufficiently, and then separated by standing still. In addition, residence time in each stage is not especially limited and 15 to 45 minutes is used.

Solution temperature to be used in the above step (1) is not especially limited and it is preferable to be from 20 to 40° C. In addition, ratio of the organic phase to the water phase (organic phase/water phase ratio) is not especially limited, and it is preferable to be from 5 to 1/5, and more preferable to be from 3 to 1.

The step (2) is a scrubbing stage for bringing the amine-type extractant (B), where a chloride ion obtained in the step (1) is substituted to a sulfuric acid ion, into contact with water to eliminate a metal. Here, because a chloro complex of iron or zinc having high complex formation capability, is dissolved by scrubbing the extractant (B) having sufficiently reduced concentration of a chloride ion with water, sufficient elimination of iron or zinc can be carried out easily.

Contacting stage number of the amine-type extractant (B) and water to be used in the above step (2), that is, stage number of scrubbing stages, is not especially limited, and it is preferable to carry out under 2 to 6 multistages than 1 stage. That is, it is because of strong influence of chloride ion concentration in water to be used as a scrubbing solution on anion selectivity of the extractant, and even in the case of using the same amount of water, the multistage is more capable of enhancing elimination ratio of a metal chloro complex ion.

As operation of each stage of the above scrubbing stages, a batch system or a continuous system such as a counter-current, parallel-current is used, and in each stage, there is used a solvent extraction apparatus of such as a mixer-settler system generally industrialized, where an organic phase and a water phase are subjected to mixing and contacting, for example, by stirring, so as to be contacted sufficiently, and then separated by standing still. In addition, residence time in each stage is not especially limited and 15 to 45 minutes is used.

Solution temperature to be used in the above step (2) is not especially limited and it is preferable to be from 20 to 40° C. In addition, ratio of the organic phase to the water phase (organic phase/water phase ratio) is not especially limited, and it is preferable to be from 5 to 1/5, and more preferable to be from 3 to 1.

As the amine-type extractant (A) to be used in the above method, it is one composed of an amine-type extractant containing an amine added with hydrochloric acid and an amine supporting a metal chloro complex ion, for example, it is preferably a reversed extracted amine-type extractant produced in the reversed extraction stage for eliminating cobalt by an aqueous solution of diluted hydrochloric acid, from the extractant supporting cobalt, which is produced in the extraction stage constituting the solvent extraction step, in the solvent extraction step for separating nickel and cobalt in a leaching solution having the aqueous solution of an acidic chloride containing nickel and cobalt, along with trace amount of other metals.

As the above leaching solution, for example, it is produced by a sulfuric acid leaching method or a chlorine leaching method of a nickel ore or nickel sulfide. It should be noted that in the sulfuric acid leaching method, conversion of the leaching solution to an aqueous solution of an acidic chloride is carried out.

The above solvent extraction step is one containing an extraction stage for supporting the metal chloro complex ion contained in the aqueous solution of an acidic chloride onto the extractant by the amine-type extractant constituting an organic phase, and a subsequent reversed extraction stage for eliminating cobalt, which is supported on the extractant of the organic phase, by an aqueous solution forming a water phase, and a scrubbing stage for subsequently separating and removing components remaining in the organic phase by an elimination or substitution reaction by the aqueous solution forming the water phase.

In the extraction stage of this solvent extraction step, the organic phase composed of the amine-type extractant and the water phase composed of the aqueous solution of an acidic chloride are subjected to mixing and contacting, a chloro complex ion of cobalt contained in the aqueous solution is supported on the extractant, and nickel is left in an extraction residual liquid. In this case, when a chloro complex ion such as iron, zinc, copper is present together, it is supported onto the extractant. In addition, in the subsequent reversed extraction stage, the organic phase from the extraction stage and the water phase composed of the aqueous solution of dilute hydrochloric acid are subjected to mixing and contacting, and cobalt supported on the organic phase is transferred to the water phase and separated.

Therefore, as a metal component of an amine supporting the above metal chloro complex ion, there is included iron, zinc, copper or the like, which forms a chloro complex ion and forms a firmer chloro complex than cobalt, and in particular, the cases to be iron and/or zinc are important. For example, in the case where concentration of iron and/or zinc accumulated in a reversed extracted organic phase is high, removal of zinc in scrubbing with water may become insufficient, because of insufficient reduction of chloride ion concentration in the amine-type extractant (B). Therefore, in applying a method of the present invention to practical operation, as controlled value of metal concentration in the organic phase with reversed extracted cobalt, it is preferable as low concentration as possible. However, the above controlled value may be determined arbitrarily and suitably, based on metal concentration of a process solution to be applied and selectivity in solvent extraction.

The above amine-type extractant is not especially limited, and tertiary amines having excellent selectivity between nickel and cobalt are used, and among these, at least one kind of a tertiary amine selected from TNOA or TIOA is preferable, and TNOA is more preferable. It should be noted that the above tertiary amine is mixed with a diluent composed of an aromatic hydrocarbon, and may be used so as to contain in an amount of from 10 to 40% by volume relative to total amount of the amine-type extractant (A), in view of viscosity and extraction efficiency of the organic phase, if necessary.

Because the above scrubbing method of the present invention uses sulfuric acid and water as scrubbing solutions, and different from a method by alkali neutralization, it is capable of scrubbing by a one-through wet-system method not containing a filtering step and without formation of clad caused by generation of a hydroxide of iron or zinc. Still more, because the amine-type extractant obtained from a scrubbing stage does not return to a free amine, and only substituted and added with sulfuric acid generally at a site to be added with hydrochloric acid, it has sufficient separation capability of cobalt and nickel without the addition of hydrochloric acid, in the case of repeated use in an extraction stage using an aqueous solution of an acidic chloride with high concentration of the chloride.

EXAMPLES

Explanation will be given below in still more detail on the present invention with reference to Examples and Comparative Examples of the present invention, however, the present invention should not be limited to these Examples. It should be noted that analysis of metals used in Examples and Comparative Examples was carried out with an ICP emission spectrometry. It should be noted that an organic phase was chemically decomposed, and metal components in removal residue was analyzed.

Example 1 and Reference Examples 1 and 2

An organic phase having relatively low accumulation degree of accumulated metals in an organic phase, with a total metal concentration of Fe and Zn of about 1.2 g/L, was used.

First, by using an organic phase a (diluent: an aromatic hydrocarbon) with a TNOA concentration of 40% by volume, and having metal components concentrations as shown in Table 1, multistage scrubbing (washing) was carried out under the following condition, to determine metal components concentrations in the organic phase after scrubbing, impurity removal ratio for sum of iron and zinc, along with removal ratio of metal components from the resulting organic phase at each washing time, and chlorine concentration of a scrubbing solution. The results are shown in Tables 2 and 3. It should be noted that formation of clad was not observed.

[Scrubbing Conditions]

By using a sulfuric acid solution with a concentration of 5 N as a scrubbing solution, and under organic phase/water phase ratio=2/1, 4 times of mixing and contacting were carried out by freshly replacing the water phase each time, and then by using water as a scrubbing solution, under organic phase/water phase ratio=2/1, 2 times of mixing and contacting were carried out by freshly replacing the water phase each time. It should be noted that scrubbing was carried out at room temperature.

TABLE 1

| | Components concentrations (g/l) | | | |
|---|---|---|---|---|
| | Co | Cu | Fe | Zn |
| Organic phase a (before washing) | 0.01 | 0.45 | 0.40 | 0.84 |

TABLE 2

| | Components concentrations (g/l) | | | | Impurity removal ratio (%) |
|---|---|---|---|---|---|
| | Co | Cu | Fe | Zn | |
| Organic phase after washing | <0.01 | 0.02 | 0.01 | 0.05 | 96 |

TABLE 3

| | Components removal ratios from organic phase (%) | | | | Chlorine concentration of scrubbing solution (g/l) |
|---|---|---|---|---|---|
| | Co | Cu | Fe | Zn | |
| Sulfuric acid washing (1st stage) | 100 | 39 | <1 | <1 | 26 |
| Sulfuric acid washing (2nd stage) | 100 | 93 | 2 | <1 | 14 |
| Sulfuric acid washing (third stage) | 100 | 100 | 7 | <1 | 8 |
| Sulfuric acid washing (fourth stage) | 100 | 100 | 18 | 2 | 5 |
| Water washing (2 stages in total) | 100 | 100 | 95 | 88 | <1 |

From Table 2, it is understood that by a method for scrubbing of the present invention, sufficient removal of iron, zinc and copper is attained. In addition, from Table 3, it is understood that a sulfuric acid ion substitutes selectively a chloride ion in the organic phase, and by scrubbing the organic phase with water, after chlorine ion concentration in the organic phase is reduced sufficiently, a chloro complex is dissolved, and iron, zinc and copper in the organic phase are removed.

Then, by using the obtained organic phase after scrubbing, extraction capability of the organic phase was studied under the following condition. The results are shown in Table 4. In Table 4, there are also shown, at the same time, extraction results by using an organic phase obtained by the addition of 2 N hydrochloric acid (Reference Example 1) or sulfuric acid (Reference Example 2) to a freshly prepared organic solvent (a TNOA: concentration of 40% by volume, diluent: an aromatic hydrocarbon), as Reference Examples 1 and 2.

[Evaluation of Extraction Capability of the Organic Phase]

By using a nickel chloride starting solution with components constitution shown in Table 4 as a water phase, it was subjected to mixing and contacting with a fresh organic phase or an organic phase after scrubbing, under organic phase/water phase ratio=1/1, and then metal components in an extraction residual liquid were analyzed.

TABLE 4

| | Components concentrations (g/l) | | | | | | |
|---|---|---|---|---|---|---|---|
| | Ni | Co | Cu | Fe | Zn | $Cl^-$ | $SO_4^{2-}$ |
| Nickel chloride starting solution. | 173 | 10.02 | 0.87 | 0.17 | 0.31 | 219 | 13 |
| Ref. Example 1 extract. residual liquid. | 174 | 0.35 | 0.04 | <0.01 | <0.01 | 216 | 13 |
| Ref. Example 2 extract. residual liquid. | 172 | 0.36 | 0.03 | <0.01 | <0.01 | 184 | 72 |
| Example 1 extraction residual liquid. | 173 | 0.56 | 0.04 | <0.01 | <0.01 | 190 | 67 |
| Example 4 extraction residual liquid. | 173 | 0.77 | 0.03 | 0.01 | <0.01 | 197 | 52 |
| Example 5 extraction residual liquid. | 173 | 0.74 | 0.05 | 0.01 | <0.01 | 197 | 51 |
| Example 6 extraction residual liquid. | 174 | 0.81 | 0.04 | 0.01 | <0.01 | 201 | 45 |

From Table 4, it is understood that in Example 1, cobalt in the extraction residual liquid was sufficiently reduced, and the organic phase after scrubbing has sufficient extraction capability, even by comparing with the fresh organic phases of Reference Examples 1 and 2.

(Examples 2 to 6 and Comparative Examples 1 and 2)

An organic phase having relatively high accumulation degree of accumulated metals in an organic phase, with a total metal concentration of Fe and Zn of about 5.3 g/L, was used.

First, by using an organic phase b (diluent: an aromatic hydrocarbon) with a TNOA concentration of 40% by volume, and having metal components concentrations as shown in Table 5, sulfuric acid multistage, sulfuric acid single-stage, or water multistage scrubbing (washing) was carried out under the following condition, to determine metal components concentrations in the organic phase after scrubbing, and impurity removal ratio for sum of iron and zinc. The results are shown in Table 6. It should be noted that formation of clad was not observed in any case.

[Scrubbing Conditions]

Sulfuric acid 4 stages-water 2 stages scrubbing: By using sulfuric acid with a concentration of 10 N (Example 2), 7 N (Example 3), 5 N (Example 4), 4 N (Example 5), and 2 N (Comparative Example 1), as a scrubbing solution, and under organic phase/water phase ratio=2/1, 4 times of mixing and contacting were carried out, by freshly replacing the water phase each time, and then by using water as a scrubbing solution, under organic phase/water phase ratio=2/1, 2 times of mixing and contacting were carried out by freshly replacing the water phase each time.

Examples 2 to 5 and Comparative Example 1

Sulfuric acid single stage-water 2 stages scrubbing: By using a sulfuric acid solution with a concentration of 5 N as a scrubbing solution, and under organic phase/water phase ratio=1/2, 1 time of mixing and contacting was carried out, and then by using water as a scrubbing solution, under organic phase/water phase ratio=2/1, 2 times of mixing and contacting were carried out by freshly replacing the water phase each time.

Example 6

Water 6 stages scrubbing: By using pure water as a scrubbing solution, and under organic phase/water phase ratio=2/1, 6 times of mixing and contacting were carried out by freshly replacing the water phase each time. (Comparative Example 2)

It should be noted that scrubbing was carried out at room temperature in any of these cases.

TABLE 5

|  | Components concentrations (g/l) | | | |
| --- | --- | --- | --- | --- |
|  | Co | Cu | Fe | Zn |
| Organic phase b (before washing) | 0.01 | 1.88 | 1.73 | 3.59 |

TABLE 6

|  | Scrubbing condition (Solution kind, stage) | Components concentrations in organic phase after washing (g/l) | | | | Impurity removal ratio (%) |
| --- | --- | --- | --- | --- | --- | --- |
|  |  | Co | Cu | Fe | Zn |  |
| EXAMPLE 2 | Sulfuric acid 10N, multistage | <0.01 | 0.06 | <0.01 | 1.32 | 82 |
| EXAMPLE 3 | Sulfuric acid 7N, multistage | <0.01 | 0.04 | <0.01 | 1.50 | 80 |
| EXAMPLE 4 | Sulfuric acid 5N, multistage | <0.01 | 0.03 | <0.01 | 1.68 | 76 |
| EXAMPLE 5 | Sulfuric acid 4N, multistage | <0.01 | 0.02 | <0.01 | 1.83 | 74 |
| EXAMPLE 6 | Sulfuric acid 5N, single stage | <0.01 | 0.09 | <0.01 | 2.45 | 65 |
| Comp. Exam. 1 | Sulfuric acid 2N, multistage | <0.01 | 0.33 | 1.01 | 3.55 | 33 |
| Comp. Exam. 2 | Pure water, multistage | <0.01 | 0.56 | 1.05 | 3.43 | 31 |

From Table 6, it is understood that, in a method of the present invention using sulfuric acid with a concentration of 10 N (Example 2), 7 N (Example 3), 5 N (Examples 4 and 6), and 4 N (Example 5), and water, iron, zinc and copper in the organic phase can be removed more efficiently than scrubbing by using water (Comparative Example 2) and a 2 N sulfuric acid solution (Comparative Example 1). It should be noted that, in a concentration of 10 N (Example 2) and 7 N (Example 3), selectivity of a sulfuric acid ion was increased more than a zinc chloro complex ion, and further enhancement of removal ratio was expected, however, it did not result in sufficient removal in proportion to acid concentration. In addition, in sulfuric acid single stage-water 2 stages scrubbing (Example 6), efficiency is a little lowered as compared with sulfuric acid 4 stages-water 2 stages scrubbing. That is, it is preferable that sulfuric acid scrubbing is carried out by multistage.

Then, by using the organic phase after scrubbing obtained in Examples 4 to 6, extraction capability of the organic phase was studied under the following condition. The results are shown in Table 4.

[Evaluation of Extraction Capability of the Organic Phase]

By using a nickel chloride starting solution with components constitution as shown in Table 4 as a water phase, it was subjected to mixing and contacting with a fresh organic phase or an organic phase after scrubbing under organic phase/water phase ratio=1/1, and then metal components in an extraction residual liquid were analyzed.

From Table 4, it is understood that cobalt in the extraction residual liquid of Examples 4 and 6 was sufficiently reduced, and the organic phase after scrubbing has sufficient extraction capability, even by comparing with the fresh organic phases of Reference Examples 1 and 2.

Examples 7 and 8, and Comparative Examples 3 and 4

By determination of relation between use amount of a scrubbing solution and removal ratio of zinc, which has high formation capability of a chloro complex ion, superiority of a method of the present invention was evaluated.

By using an organic phase c (diluent: an aromatic hydrocarbon) with a TNOA concentration of 40% by volume, and having metal components concentrations as shown in Table 7, multistage scrubbing (washing) was carried out under the following condition, to determine zinc removal ratio from the organic phase obtained at each washing time. The results are shown in FIG. 1. FIG. 1 shows accumulated zinc removal ratio in each of scrubbing times. It should be noted that formation of clad was not observed.

[Scrubbing Conditions]

Sulfuric acid 4 stages-water 2 stages scrubbing: By using a sulfuric acid solution with a concentration of 5 N as a scrubbing solution, and under organic phase/water phase (O/A) ratio=2/1, 4 times of mixing and contacting were carried out, by freshly replacing the water phase each time, and then by using water as a scrubbing solution, under organic phase/water phase (O/A) ratio=2/1, 2 times of mixing and contacting were carried out by freshly replacing the water phase each time. (Example 7)

Sulfuric acid 2 stages-water 2 stages scrubbing: By using a sulfuric acid solution with a concentration of 5 N as a scrubbing solution, and under organic phase/water phase (O/A) ratio=2/1, 2 times of mixing and contacting were carried out, and then by using water as a scrubbing solution, under organic phase/water phase (O/A) ratio=2/1, 2 times of mixing and contacting were carried out by freshly replacing the water phase each time. (Example 8)

Low concentration sulfuric acid 6 stages scrubbing (without water scrubbing): By using a sulfuric acid solution with a concentration of 0.6 N as a scrubbing solution, and under organic phase/water phase (O/A) ratio=2/1, 6 times of mixing and contacting were carried out, by freshly replacing the water phase each time. (Comparative Example 3)

Water 6 stages scrubbing: By using pure water as a scrubbing solution, and under organic phase/water phase (O/A) ratio=2/1, 6 times of mixing and contacting were carried out, by freshly replacing the water phase each time. (Comparative Example 4)

It should be noted that scrubbing was carried out at room temperature in any of these cases.

TABLE 7

|  | Components concentrations (g/l) | | | |
|---|---|---|---|---|
|  | Co | Cu | Fe | Zn |
| Organic phase c (before washing) | 0.01 | 0.23 | 0.20 | 0.42 |

From FIG. 1, it is understood that in Examples 7 and 8, sufficient zinc removal ratio is obtained by less scrubbing times. On the other hand, in Comparative Examples 3 and 4, it is understood that sufficient zinc removal ratio is not obtained even by 6 stages scrubbing. From these facts, superiority was shown that a method of the present invention is capable of significantly reducing scrubbing solution amount, as compared with a conventional method of water scrubbing or low concentration sulfuric acid scrubbing without accompanying water scrubbing.

Still more, as a study result of extraction capability of the organic phase, similarly to in Example 1, by using the organic phase after scrubbing obtained in Examples 7 to 8, it was shown that the organic phase after scrubbing had sufficient extraction capability.

Comparative Example 5

By using an organic phase a (diluent: an aromatic hydrocarbon) with a TNOA concentration of 40% by volume, and having metal components concentrations as shown in Table 1, scrubbing was carried out under the following condition, to study a removal state of iron, zinc and copper from the organic phase and a formation state of clad: and it was found that iron, zinc and copper were removed completely from the organic phase, however, clad was formed during scrubbing.
[Scrubbing Conditions]
By using an aqueous solution of sodium hydroxide with a concentration of 2 N as a scrubbing solution, mixing and contacting were carried out under organic phase/water phase ratio=1/1. It should be noted that scrubbing was carried out at room temperature.

As is clear from the above, it is understood that, in Examples 1 to 8, because 2 stages scrubbing was carried out, by using a sulfuric acid solution with a concentration of 3 to 10 N and water, according to a method of the present invention, iron, zinc and copper in an organic phase can be removed efficiently without formation of clad, and with small amount of a scrubbing solution, and extraction capability of an extractant can be regenerated, so that it can be reused repeatedly as it is in the extraction stage. On the other hand, it is understood that, in Comparative Examples 1 to 5, because scrubbing solutions do not satisfy these conditions, satisfactory results are not obtained in view of any of zinc removal ratio from the organic phase, amount of scrubbing solution, or clad formation.

As described above, a method for scrubbing an amine-type extractant of the present invention is capable of efficiently removing the metal chloro complex ion, as well as capable of regenerating extraction capability of the extractant, so that it can be reused repeatedly as it is in the extraction stage of the solvent extraction step, in regeneration of extraction capability of the amine-type extractant supporting a chloro complex ion of a metal such as iron, zinc, which easily accumulates in the amine-type extractant, therefore it is suitable as a method for scrubbing in using an amine-type extractant in a solvent extraction method, utilized in particular, in a field of a non-ferrous metal metallurgy.

What is claimed is:

1. A method for scrubbing an extractant in hydrometallurgy of a non-ferrous metal, which comprises steps in the following order:
   providing an extractant, for non-ferrous metals, in the form of amine extractant (A) comprising an amine compound, wherein said amine compound comprises a mixture of:
   (i) hydrochloride of said amine compound, and
   (ii) a salt of said amine compound with a metal chloro complex ion, wherein said amine compound is at least one kind of tertiary amine selected from the group consisting of Tri-n-octylamine (TNOA) and Tri-i-octylamine (TIOA);
   contacting said amine extractant (A) with a sulfuric acid solution with a concentration of 3 to 10 N to thereby form amine extractant (B) in which said hydrochloride (i) is converted to sulfate of said amine compound; and
   contacting said amine extractant (B) with water to thereby eliminate a metal from said metal chloro complex ion in said salt (ii).

2. The method for scrubbing an extractant according to claim 1, wherein said extractant in the form of said amine extractant (A) is provided by a method comprising:
   contacting, with an organic phase comprising said hydrochloride (i), an acidic aqueous solution of metal chlorides as an aqueous phase, said solution containing cobalt chloride and at least a portion of said metal chlorides being present in the form of a metal chloro complex ion, to thereby effect a reaction of said hydrochloride (i) with said metal chloro complex ion to form a reaction mixture in which at least a portion of said hydrochloride (i) in said organic phase is converted to said salt (ii) and said salt (ii) is transferred from said aqueous phase to said organic phase; and
   contacting said organic phase separated from said reaction mixture with an aqueous solution as an aqueous phase, to thereby transfer said cobalt chloride converted to said salt (ii) from said organic phase to said aqueous phase and eliminate cobalt from said metal chloro complex ion in said salt (ii).

3. The method for scrubbing an extractant according to claim 1, wherein said extractant in the form of said amine extractant (A) is provided by a method comprising:
   providing a leaching solution comprising an acidic aqueous solution of chlorides of nickel and cobalt, along with trace amount of chlorides of other metals, at least a portion of said chlorides except for nickel chloride being present in the form of a metal chloro complex ion;
   contacting said leaching solution as an aqueous phase with an organic phase comprising said hydrochloride (i) to thereby effect a reaction of said hydrochloride (i) with said metal chloro complex ion to form a reaction mixture in which said nickel chloride remains in said aqueous phase, at least a portion of said hydrochloride (i) in said organic phase is converted to said salt (ii) and said salt (ii) is transferred from said aqueous phase to said organic phase; and
   contacting said organic phase separated from said reaction mixture with a diluted hydrochloric acid solution as an aqueous phase, to thereby transfer said cobalt chloride converted to said salt (ii) from said organic phase to said aqueous phase and eliminate cobalt from said metal chloro complex ion in said salt (ii).

4. The method for scrubbing an extractant according to claim 1, wherein said extractant further comprises a diluent composed of an aromatic hydrocarbon in an amount of from 10 to 40% by volume relative to total amount of said amine extractant (A).

5. The method for scrubbing an extractant according to claim 1, wherein the concentration of said sulfuric acid solution is from 4 to 5 N.

6. The method for scrubbing an extractant according to claim 1, wherein the number of stages for contacting said amine extractant (A) with said sulfuric acid solution is from 2 to 4.

7. The method for scrubbing an extractant according to claim 1, wherein said metal eliminated from said metal chloro complex ion in said salt (ii) is iron and/or zinc.

8. The method for scrubbing an extractant according to claim 2, wherein said metal eliminated from said metal chloro complex ion in said salt (ii) is iron and/or zinc.

9. The method for scrubbing an extractant according to claim 3, wherein said metal eliminated from said metal chloro complex ion in said salt (ii) is iron and/or zinc.

10. The method for scrubbing an extractant according to claim 4, wherein said metal eliminated from said metal chloro complex ion in said salt (ii) is iron and/or zinc.

11. The method for scrubbing an extractant according to claim 5, wherein said metal eliminated from said metal chloro complex ion in said salt (ii) is iron and/or zinc.

12. The method for scrubbing an extractant according to claim 6, wherein said metal eliminated from said metal chloro complex ion in said salt (ii) is iron and/or zinc.

* * * * *